UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

FERTILIZER.

1,112,183.      Specification of Letters Patent.      Patented Sept. 29, 1914.

No Drawing. Original application filed July 10, 1912, Serial No. 708,548. Divided and this application filed August 17, 1912. Serial No. 715,570.

*To all whom it may concern:*

Be it known that we, THOMAS LEOPOLD WILLSON and MAXIMILIAN MATTHEUS HAFF, both of the city of Ottawa, Province of Ontario, Dominion of Canada, have invented certain new and useful Improvements in Fertilizers, and do hereby declare the following to be a full, clear, and exact description of the same.

This invention relates to an improved fertilizer produced by a novel method of drying monocalcic phosphate and the like, applicable particularly to such phosphates as contain an excess of acid or are prepared from natural phosphate rock by the addition of phosphoric acid, and the objects are to produce a relatively dry and powdered fertilizer from monocalcic phosphate without affecting its relative solubility.

Ordinary superphosphate contains from 14 to 16 per cent of phosphoric acid ($P_2O_5$) and is in a comparatively dry state and suitable for use as a fertilizer. It contains monocalcium phosphate. It is prepared usually by the addition of sulfuric acid to a natural phosphate rock. To obtain calcium phosphate fertilizers having a higher percentage of available phosphoric acid, it is the practice to add phosphoric acid itself to natural phosphate rocks, to produce "double superphosphate." The compounds produced contain from 20 to 60 per cent of phosphoric acid ($P_2O_5$) but are in a more or less moist or damp condition and unsuitable for handling as a fertilizer, the degree of moisture varying with the amount of free phosphoric acid ($P_2O_5$). It is not practicable to use ordinary drying methods with this highly concentrated compound for the reason that the cost of such operations would be far in excess of the added value given by drying to the compound as a fertilizer.

According to the present invention, ammonia, preferably in the form of dry gas, is introduced into the damp or pasty mass of double superphosphate containing monocalcic phosphate. This phosphate may be produced by treating natural phosphate rock with an aqueous solution of phosphoric acid; which may be the commercial form of liquid phosphoric acid. The function of the ammonia is two-fold. In the first place it combines with the monocalcic phosphate to produce an ammonium calcium phosphate compound as hereinafter described, thereby increasing the fertilizing properties of the compound; and in the second place the heat liberated by its reaction with the monocalcic phosphate is sufficient to dry the mass and expel any uncombined moisture without producing detrimental chemical changes therein.

In practising the invention we have found that a small amount, say 10 to 15 per cent., of ammonia as vapor is sufficient, the exact amounts varying according to the amount of free phosphoric acid ($P_2O_5$) present, the ammonia forming calcium-ammonium phosphate ($Ca(NH_4)H_3(PO_4)_2$) with the monocalcium phosphate and ammonium phosphate and ammonium phosphate with any free phosphoric acid present.

It will be seen that the fact that the reaction of the ammonia with the monocalcic phosphate is exothermic, causes any uncombined moisture in the mass to be expelled, thereby producing a commercially dry salt more adaptable for use as a fertilizer than the original moist or damp monocalcic phosphate. In addition to this a desirable quantity of nitrogen is introduced into the compound which increases its fertilizing value. The ammonium compound produced does not injuriously affect the availability of the phosphoric acid, as after treatment the $P_2O_5$ of the fertilizer will still be found to be soluble in the standard ammonium citrate solution.

The compound ammonium monocalcic phosphate produced appears to be new. From the nature of its constituents it forms a very valuable fertilizer. In physical form it is white, dry and crystalline. On heating, ammonia is liberated.

What we claim is:—

1. As a new article of manufacture, a substantially dry fertilizer composition containing monocalcium ammonium phosphate and a little ammonium phosphate and containing no free acid.

2. As a new article of manufacture, a dry fertilizer containing an ammonium calcium phosphate, such phosphate containing at least sufficient ammonia to correspond to the formula $Ca(NH_4)H_3(PO_4)_2$.

3. As a new fertilizer, a double superphosphate containing a substantial amount of combined ammonia.

In witness whereof we have hereunto set our hands in the presence of two witnesses.

THOMAS LEOPOLD WILLSON.
MAXIMILIAN MATTHEUS HAFF.

Witnesses:
RUSSELL S. SMART,
PEARLE M. GANOU.